United States Patent
Takaishi

(10) Patent No.: US 7,463,439 B2
(45) Date of Patent: Dec. 9, 2008

(54) CONTROL DEVICE, STORAGE DEVICE, STORAGE MEDIUM, SERVO DATA DEMODULATION METHOD, REPEATABLE VELOCITY ERROR MEASURING DEVICE, AND COMPUTER PRODUCT

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 11/701,056

(22) Filed: Feb. 1, 2007

(65) Prior Publication Data

US 2008/0055769 A1 Mar. 6, 2008

(30) Foreign Application Priority Data

Aug. 30, 2006 (JP) ............... 2006-234448

(51) Int. Cl.
*G11B 5/09* (2006.01)
*G11B 5/596* (2006.01)
(52) U.S. Cl. .............. 360/48; 360/77.04; 360/78.04; 360/78.07
(58) Field of Classification Search ............ None
See application file for complete search history.

(56) References Cited

U.S. PATENT DOCUMENTS

| | | | |
|---|---|---|---|
| 5,063,454 A | 11/1991 | Hashimoto | |
| 6,535,348 B1 | 3/2003 | Kagami et al. | |
| 6,898,047 B2 | 5/2005 | Shishida et al. | |
| 6,961,204 B2 | 11/2005 | Shimatani | |
| 2003/0218824 A1 * | 11/2003 | Shimatani | 360/78.06 |

FOREIGN PATENT DOCUMENTS

| | | |
|---|---|---|
| EP | 0 378 327 | 7/1990 |
| EP | 0 456 371 | 11/1991 |
| JP | 58-194171 | 11/1983 |
| JP | 02-168411 | 6/1990 |
| JP | 06-243608 | 9/1994 |
| JP | 08-180620 | 7/1996 |
| JP | 2000-123506 | 4/2000 |
| JP | 2000-173210 | 6/2000 |
| JP | 2003-16747 | 1/2003 |
| JP | 2003-338145 | 11/2003 |
| JP | 2003-346438 | 12/2003 |
| KR | 1993-009447 | 10/1993 |

* cited by examiner

*Primary Examiner*—Andrew L. Sniezek
(74) *Attorney, Agent, or Firm*—Greer, Burns & Crain, Ltd

(57) ABSTRACT

A magnetic disk device includes a position and velocity demodulating circuit. In the position and velocity demodulating circuit, a difference calculating unit demodulates a moving velocity of a magnetic head based on a phase difference in servo signals as servo data in the same sector. An overflow detecting unit detects an overflow of the demodulated moving velocity and calculates a correction value for the overflow. The overflow is corrected based on the correction value. The corrected overflow is further corrected by a correction value of a repeatable velocity error for the demodulated velocity to output an accurate demodulated velocity.

18 Claims, 14 Drawing Sheets

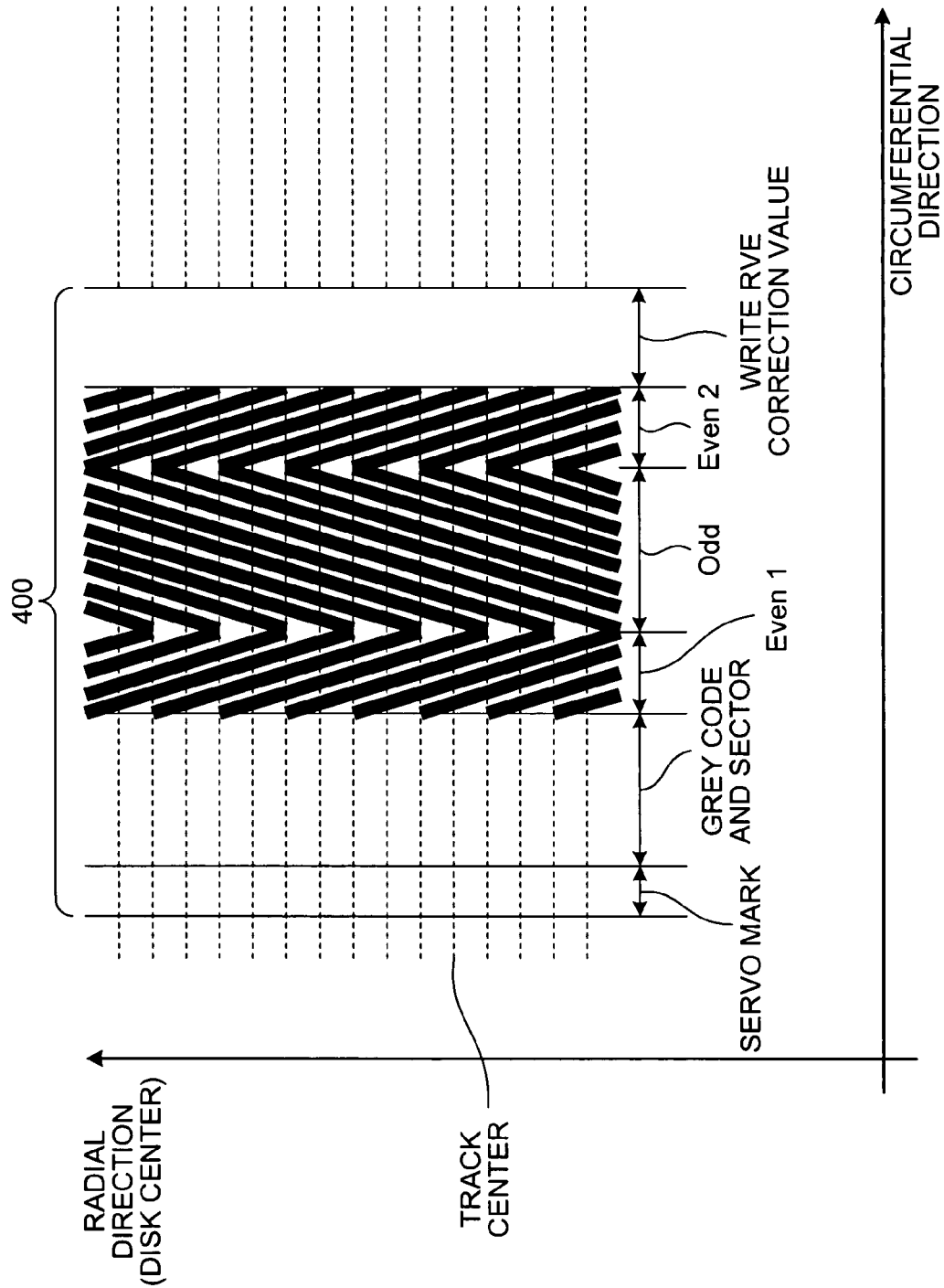

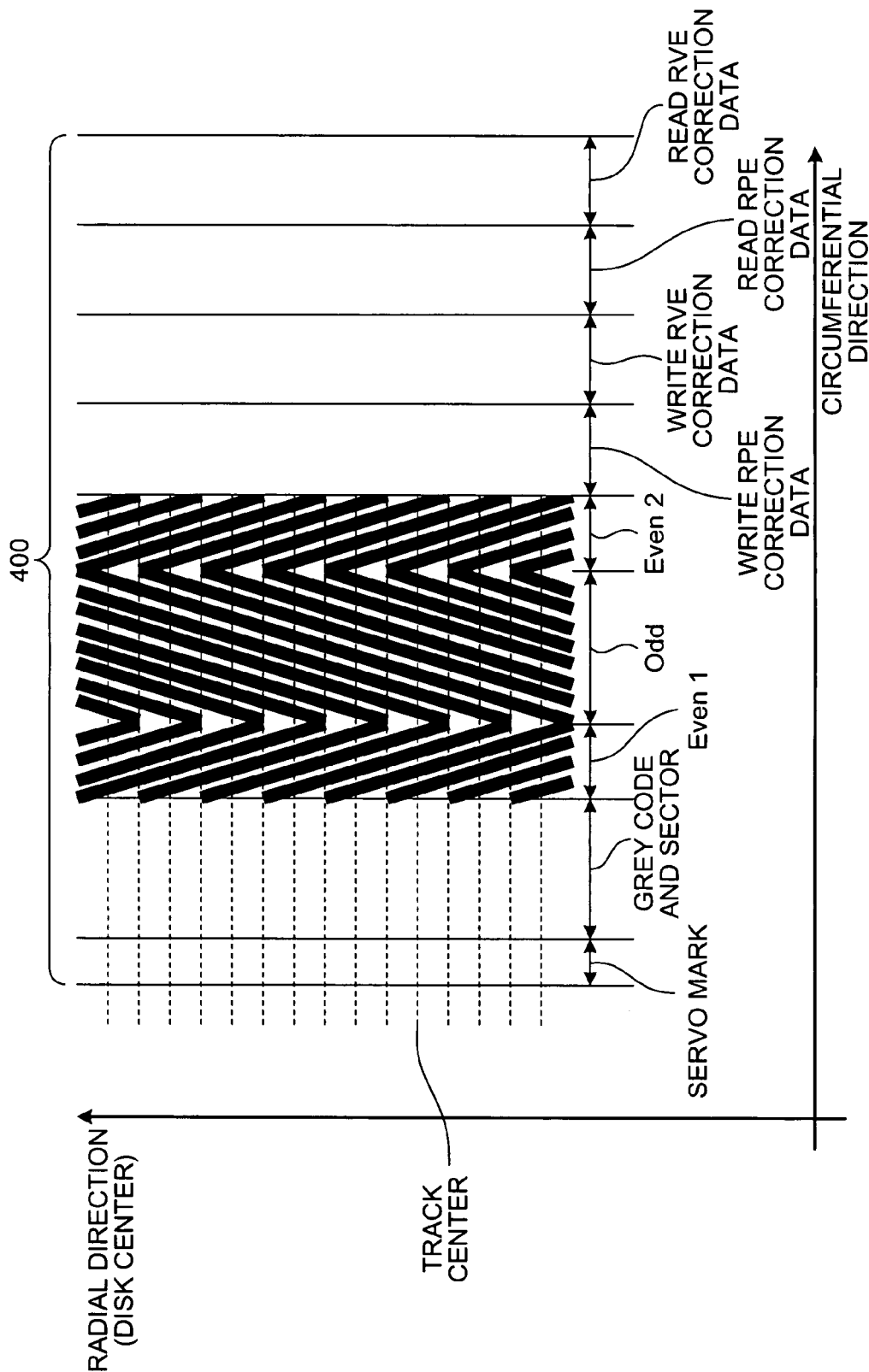

CONTROL DEVICE, STORAGE DEVICE, STORAGE MEDIUM, SERVO DATA DEMODULATION METHOD, REPEATABLE VELOCITY ERROR MEASURING DEVICE, AND COMPUTER PRODUCT

BACKGROUND OF THE INVENTION

1. Field of the Invention

The present invention relates to a technology for demodulating servo data read by a head from a storage medium.

2. Description of the Related Art

In recent years, recording density has been increasing dramatically in a storage media of storage devices such as magnetic disk devices, magneto-optical disk devices, and optical disk devices. This realizes compact storage devices having extensive recording capacity, and improves the usability of the storage devices.

Such high-density storage devices use an automatic control called servo control to position a head over a target track. Signal patterns called servo data written to the storage medium are used for servo control. Servo data includes at least track numbers and servo patterns required to demodulate the head position relative to track center.

To position the head precisely over the center of the target track, head velocity control is as important as fine head position control using the head position relative to track center obtained by demodulating the servo pattern. The position of the head as well as the head moving speed can be precisely demodulated by using the servo pattern of the servo data.

Then, the current supplied to a voice coil motor that controls the rotation of the head is controlled based on the difference between the head moving speed required to move to the next target track and the head moving speed at the current track. Accordingly, the head can be positioned over a target track quickly and precisely.

However, demodulated head moving speed is estimated based on the head position obtained by the demodulated servo data, and therefore, the head moving speed is not accurate and some error is expected.

To circumvent this problem, various servo data demodulation methods are disclosed in, for example, Japanese Patent Application Laid-open Nos. H8-180620, H2-168411, 2000-123506, 2003-338145, 2003-346438, 2000-173210. According to the conventional methods, the head speed is demodulated along with the head position using signals read from the servo data. That is, the moving speed of the head is demodulated directly from the servo data and not calculated from the demodulated positional information. Thus, the head speed can be demodulated more accurately.

However, the dramatic increase in the recording density has become possible because of a decrease in the track width. The decrease in the track width has given rise to limitations in the precision by which servo patterns of the servo data used for demodulating the head speed are formed. As a result, in the conventional technologies disclosed in patent documents 1 to 6, the demodulated velocity tends to include a repeatable velocity error, which is a velocity error synchronous with the disk rotation. As a result, a feedback control performed using the incorrect demodulated velocity will be inaccurate.

SUMMARY OF THE INVENTION

It is an object of the present invention to at least partially solve the problems in the conventional technology.

According to an aspect of the present invention, a control device that demodulates servo data read by a head from a storage medium of a storage device, includes a demodulating unit that demodulates a moving velocity of the head based on the servo data, and a correcting unit that corrects demodulated moving velocity by a correction value for a repeatable velocity error in the storage medium.

According to another aspect of the present invention, a storage device includes a control device that demodulates servo data read by a head from a storage medium, a demodulating unit that demodulates a moving velocity of the head based on the servo data, and a correcting unit that corrects demodulated moving velocity by a correction value for a repeatable velocity error in the storage medium.

According to still another aspect of the present invention, a storage medium that stores therein servo data based on which a control device of a storage device demodulates a, moving velocity of a head, wherein the servo data includes a correction value of a repeatable velocity error for the moving velocity of the head that is demodulated when data is written to the storage medium.

According to still another aspect of the present invention, a servo data demodulation method for demodulating servo data read by a head from a storage medium of a storage device, includes demodulating a moving velocity of the head based on the servo data, and correcting demodulated moving velocity by a correction value for a repeatable velocity error in the storage medium.

According to still another aspect of the present invention, a repeatable velocity error measuring device that measures repeatable velocity error that occurs when servo data is read from a storage medium to be used for positioning of a head over a target position on the storage medium in a storage device, and includes an error measuring unit that measures the repeatable velocity error related to a moving velocity of the head based on information on the target position.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 15 and 16 are examples of a servo-data pattern according to other embodiments of the present invention.

DETAILED DESCRIPTION OF THE PREFERRED EMBODIMENTS

Exemplary embodiments of the present invention are described below with reference to the accompanying drawings. In the following embodiments, a magnetic disk device and a magnetic disk are cited as a storage device and a storage medium, respectively, by way of example and without limitation. Examples of the storage device and the storage medium include an optical disk device and an optical disk, and a magneto-optical disk device and a magneto-optical disk.

Figure 1:
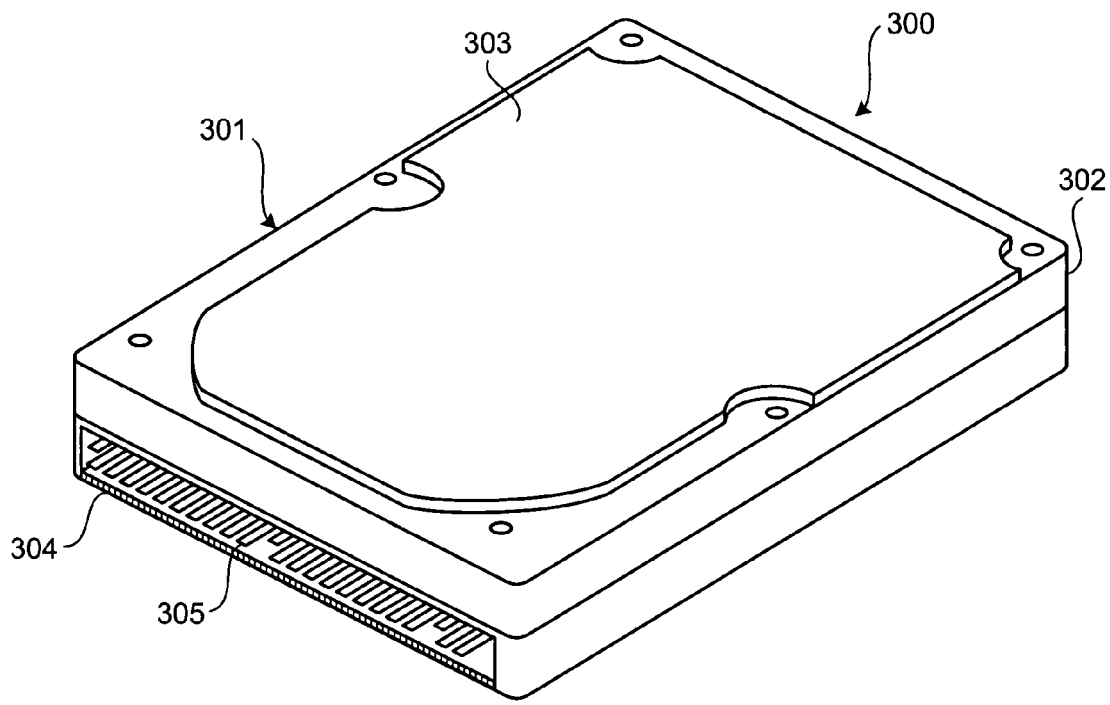
FIG. 1 is a schematic external view of a magnetic disk device according to an embodiment of the present invention.

FIG. 1 is a schematic external view of a magnetic disk device 300 according to an embodiment of the present invention. The magnetic disk device 300 includes a flat box-shaped rectangular case 301. The case 301 has a box-shaped case main body 302 having a magnetic disk housing for accommodating a magnetic disk. The case main body 302 is molded of metal such as aluminum. The case main body 302 has a cover 303, which tightly closes over the housing of the case main body 302. The cover 303 is formed of a single sheet of metal by, for example, pressing. The metal sheet forming the cover 303 can also be a laminated material with shock-absorbing properties.

A printed circuit board 304 is mounted on the outer side of the bottom of the case main body 302. On the printed circuit board 304 are mounted a not shown processing device such as a central processing unit (CPU), a microcontroller unit (MCU), or a micro processing unit (MPU) and large-scale integration such as hard disk controller. In addition, the printed circuit board 304 includes connectors 305 that function as a physical interface that electrically connects the magnetic disk device 300 to a host computer. The main controllers and the hard disk controller control the entire magnetic disk device 300. A not shown control signal cable from the main control board of the host computer in which the magnetic disk device 300 is assembled and a not shown power cable are connected to the connectors 305. The main controllers and the hard disk controller are activated when power is supplied via the power cable.

Figure 2:
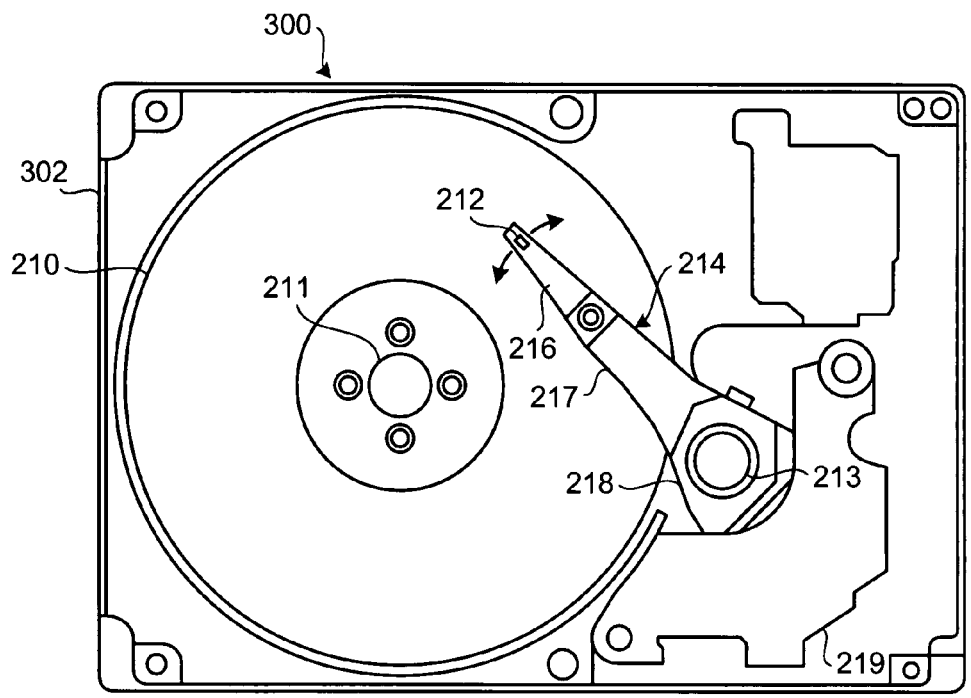
FIG. 2 is a schematic of an internal structure of the magnetic disk device.

FIG. 2 is a schematic of an internal structure of the magnetic disk device 300. If the cover 303 is removed from the magnetic disk device 300, at least one magnetic disk 210 that functions as a storage medium can be seen occupying the housing. A rotary shaft 211 of a spindle motor supports and rotates the magnetic disk 210 at high speeds, for example, a speed in the order of 7,200 rpm or 10,000 rpm.

The magnetic disk 210 is disc-shaped glass or metal substrate with a magnetic thin film formed thereon. When data is recorded on to the magnetic disk 210, the magnetic head runs over the data recording area of the magnetic disk 210 altering the magnetization state of tiny areas of the magnetic material. When reading the recorded data from the magnetic disk 210, the same magnetic head runs over the areas where data is recorded, again altering the magnetization state of the magnetic material in those areas.

The housing also accommodates a head actuator 214. The head actuator 214 includes a vertically extending pivot 213 which rotatably supports an actuator block 218. A rigid actuator arm 217 extends horizontally from the pivot 213. The actuator block 218 is cast in aluminum.

A head suspension 216 is mounted to the free end of the actuator arm 217. The head suspension 216 extends forward from the free end of the actuator arm 217. The free end of the head suspension 216 supports a floating head slider 212, which is thus linked indirectly to the actuator block 218. The floating head slider 212 faces the surface of the magnetic disk 210.

The floating head slider 212 has fastened to it the magnetic head (hereinafter sometimes simply referred to as "head"), or in other words, a not shown electromagnetic conversion element. The electromagnetic conversion element includes a read element and a write element. The read element is a giant magneto-resistance (GMR) element or a tunnel magneto-resistance (TMR) element that reads data from the magnetic disk 210 by a change in the resistance of a spin valve film or a tunnel junction film. The write element is a thin film magnetic head that writes data to the magnetic disk 210 by magnetic fields generated by thin film coil patterns.

The head suspension 216 causes the floating head slider 212 to press down towards the surface of the magnetic disk 210. The airflow generated on the surface of the magnetic disk 210 by the spinning magnetic disk 210 counters the downward pull of the floating head slider 212 and the floating head slider 212 continues to remain floating over the surface of the magnetic disk 210 due to the balance achieved between the airflow and the downward pull as well as the relatively high rigidity of the floating head slider 212 when the magnetic disk 210 is spinning.

A power source 219 such as a voice coil motor (VCM) is connected to the actuator block 218. The power source 219 drives the actuator block 218 to rotate around the pivot 213. The rotating actuator block 218 results in the oscillatory movement of the actuator arm 217 and the head suspension 216. When the actuator arm 217 oscillates due to the rotation of the rotation of the actuator block 218 around the pivot 213, the floating head slider 212 in a floating state traverses the surface of the magnetic disk 210 in the radial direction. In the case where a plurality of the magnetic disks 210 is accommodated in the case main body 302, a couple of the actuator arms 217, in other words, a couple of the head suspensions 216, are arranged between a couple of the successive magnetic disks 210.

Figure 3:
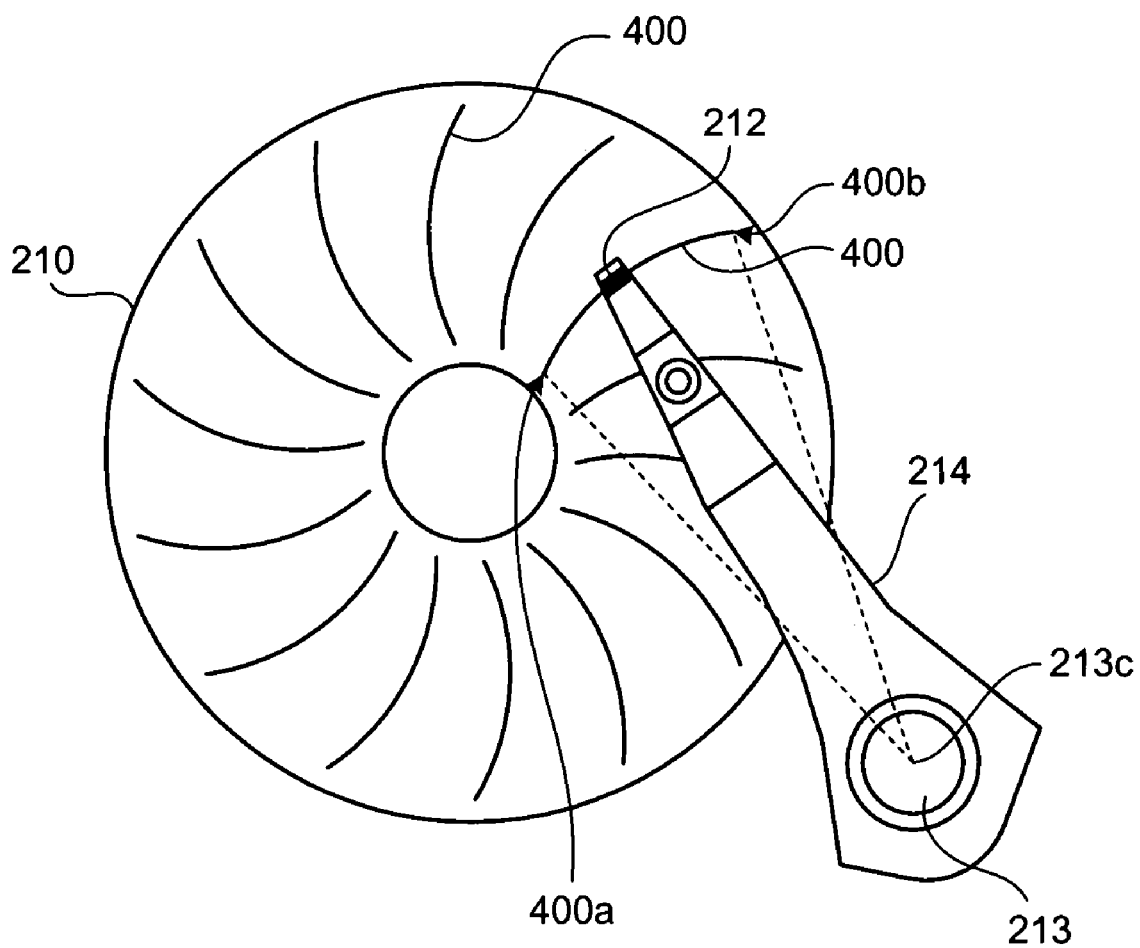
FIG. 3 is a schematic for explaining servo data.

The pattern in which servo data is written to the magnetic disk 210 accommodated in the housing in the magnetic disk device 300 is described below. FIG. 3 is a schematic of a pattern in which servo data is written to the magnetic disk 210 accommodated in the magnetic disk housing in the magnetic disk device 300. Servo data is data used for positioning the magnetic head. In the magnetic disk 210, servo data 400 is written as a magnetic pattern in the form of an arc, each arc extending radially from center to periphery of the magnetic disk 210.

The servo data 400 are arranged at regular intervals in the form of an arc extending from center to periphery of the magnetic disk 210 in a substantially radial direction on the surface thereof. The reason why the servo data is written in the form of an arc is so that when the head actuator 214 having at its free end the floating head slider 212 bearing the magnetic head rotates about a central axis 213c of the pivot 213 semicircularly between end points 400a and 400b to form a fan-shaped path, the distance from the central axis 213c to the magnetic head remains constant.

Figure 4:
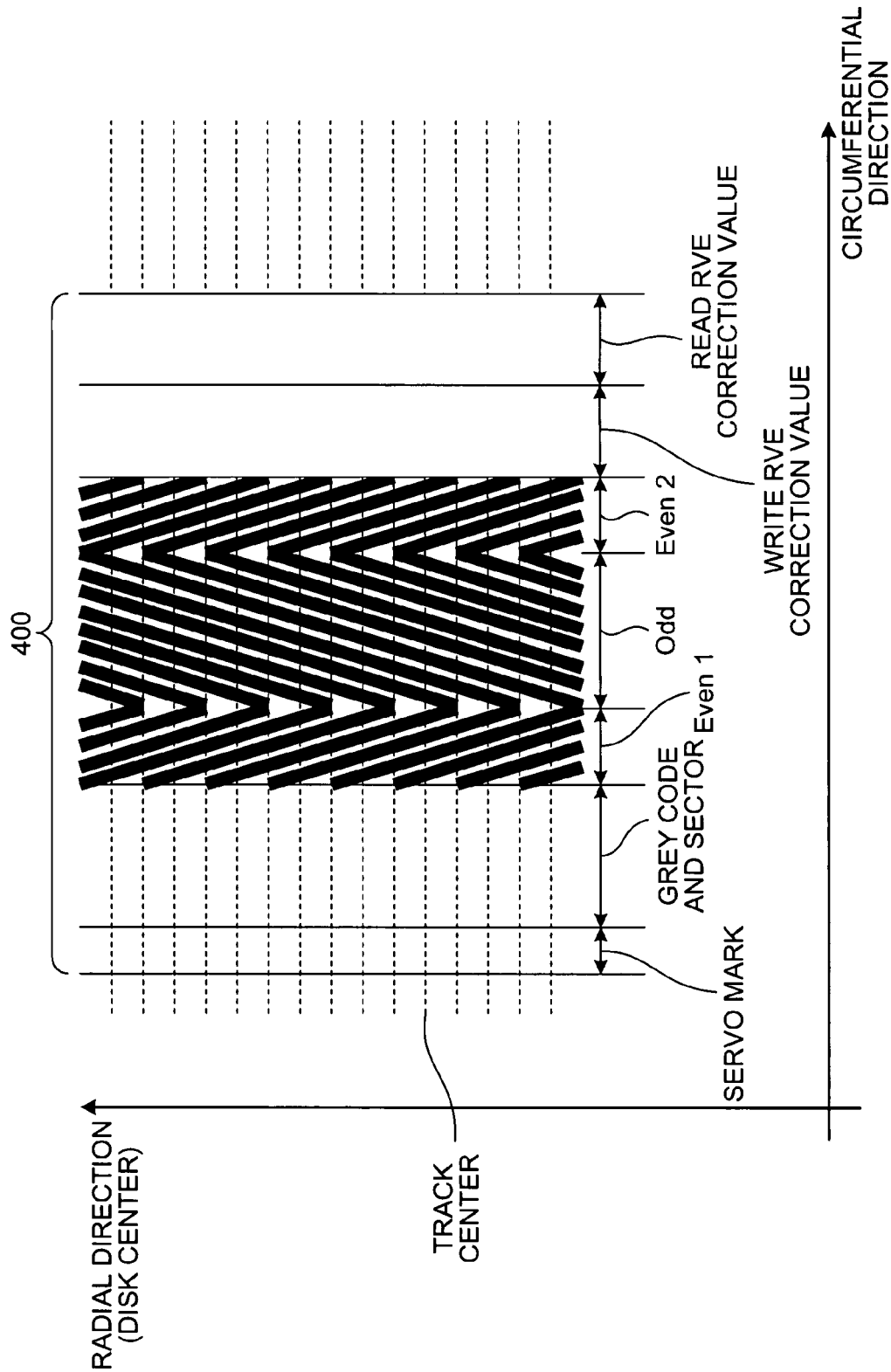
FIG. 4 is a schematic of a servo-data pattern.

FIG. 4 is a schematic enlarged view of a portion of the servo pattern of the servo data 400 in one sector in the radial direction. The servo pattern of the servo data 400 in one sector includes, in the order in which the magnetic head reads, a servo mark, gray code and sector, Even1, Odd1, Even2, write repeatable velocity error (RVE) correction value, and read RVE correction value. Servo signals are reproduced when the magnetic head reads these data along the track center represented in FIG. 4 by dashed lines.

RVE is the lag in the demodulated velocity of the head that occurs synchronous with the rotation of the magnetic disk. In other words, while the repeatable position error (RPE) indicates the demodulated position component error that occurs synchronous with the rotation of the magnetic disk, RVE indicates the demodulated velocity component error that occurs synchronous with the rotation of the magnetic disk.

The reason why repeatable error that occurs synchronous with the rotation of the magnetic disk occurs is explained below. Servo data is recorded by magnetizing grains (magnetization units) on the surface of the magnetic disk to a predetermined mode. However, the distribution density of the grain on the magnetic disk is not uniform. As a result, the data read and demodulated from the magnetic disk usually includes error. Error, especially in the head position and head velocity obtained by demodulating servo data, is not permitted, however small the phase shift. Therefore, whenever servo data is read, repeatable error synchronous with the rotation is bound to arise. However, the error can be corrected and the head can be controlled by a more accurate feedback.

The servo mark is data indicating the beginning of the servo data. Gray code and sector are areas where binary-coded decimals, and the track numbers (stored in gray code) and the sector numbers of the magnetic disk are stored. Even1 and Even2 are servo data used for demodulating the position or the moving velocity of the magnetic head, and are line patterns wherein the lines slant at the same angle in the circumferential direction of the magnetic disk. Odd, together with Even1 and Even2 forms servo data used for demodulating the position data of the magnetic disk, and is a line pattern wherein the lines slant opposing the lines in Even1 and Even2.

Thus, the moving velocity of the magnetic head is demodulated based only on the Even1 and Even2 read from the servo data within one sector of the same track. As a result, the moving velocity of the magnetic head can be more effectively demodulated.

The write RVE correction value is an area where the correction value for repeatable velocity error occurring when data is written to the magnetic disk is recorded for every track. The read RVE correction value is an area where the correction value for repeatable velocity error occurring when data is read from the magnetic disk is recorded for every track.

The present invention is not limited to a magnetic disk device having a magnetic disk with a servo pattern that enables demodulation of the moving velocity of the head based on the servo data of a single sector. The servo pattern of the magnetic disk can enable demodulation of the moving velocity of the head based on the servo data across a plurality of sectors. Further, the magnetic disk can have only the write RVE correction value, as shown in FIG. 15. The magnetic disk with the servo data having only the write RVE correction value will have no functional block and process related to the read RVE correction value, explained later.

The servo data can also include, as shown in FIG. 16, the write RPE correction data and the read RPE correction data. In this case, the function blocks and processes related to the write RPE correction data and the read RPE correction data, explained later, are added to the magnetic disk device.

Figure 5:
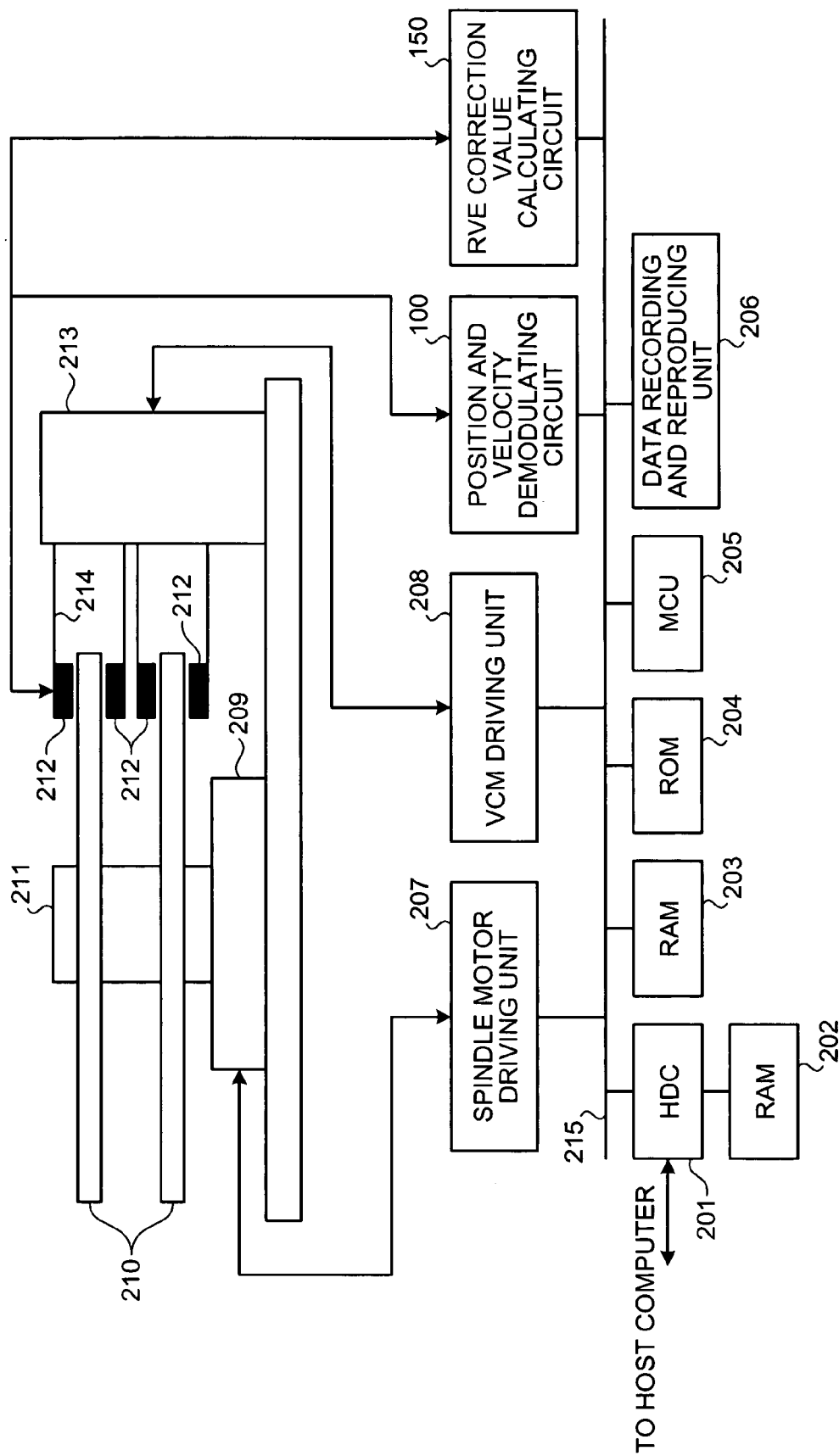
FIG. 5 is a functional block diagram of the magnetic disk device.

FIG. 5 is a functional block diagram of the magnetic disk device 300. The magnetic disk 210 that functions as a magnetic storage medium is assembled around the rotary shaft 211 of a spindle motor 209. The spindle motor 209 spins the magnetic disk 210. The head actuator 214 is mounted on the actuator that controls the motion of the pivot 213. The magnetic head is located at the free end of the head actuator 214, which moves the magnetic head to and fro in the radial direction of the magnetic disk 210.

The actuator is a VCM that rotates around the rotation axis. In FIG. 5, the magnetic disk device 300 has a couple of the magnetic disks 210 and four magnetic heads that are simultaneously driven by a single actuator.

The magnetic head includes a read element that includes a magnetoresistive element and a write element that includes a write coil. The read element is stacked on a slider, and the write element is stacked on the read element.

A position and velocity demodulating circuit 100 converts the analog position signals and velocity signals read by the magnetic head into digital signals, and the analog velocity signal read by the magnetic head and corrected by the RVE correction value into digital signals. A data recording and reproducing unit 206 controls data reading and data writing performed by the magnetic head. A spindle motor driving unit 207 drives the spindle motor 209. A VCM driving unit 208 drives the VCM in the actuator by supplying driving current.

An RVE correction value calculating circuit 150 calculates the write RVE correction value and the read RVE correction value from analog RVE signals read by the magnetic head during data writing and data reading, and converts the analog RVE signals to digital RVE signals and records the write RVE correction value and the read RVE correction value in their designated areas.

A MCU 205 demodulates the current position of the magnetic head on the magnetic disk 210 based on the digital position signals from the position and velocity demodulating circuit 100, and calculates a VCM driving command value in accordance with a difference between the demodulated current position and the target position and a difference between a target velocity and the current moving velocity of the magnetic head. That is, the MCU 205 performs position modulation, velocity modulation, and servo control. The function of the MCU can be performed by CPU or MPU.

A read-only memory (ROM) 204 stores therein control programs used by the MCU 205. A hard disk controller (HDC) 201 determines the position where data is to be written or read from based on the servo signals and the sector number and writes data to or reads data from the determined position. A random access memory (RAM) 202 is linked to the ROM 204 and temporarily stores the data to be written or read by the HDC 201. The RAM 202 temporarily stores the read data and the write data. The HDC 201 communicates with a host computer via an interface such as ATA or SCSI. All the parts described above are connected to a bus 215.

Figure 6:
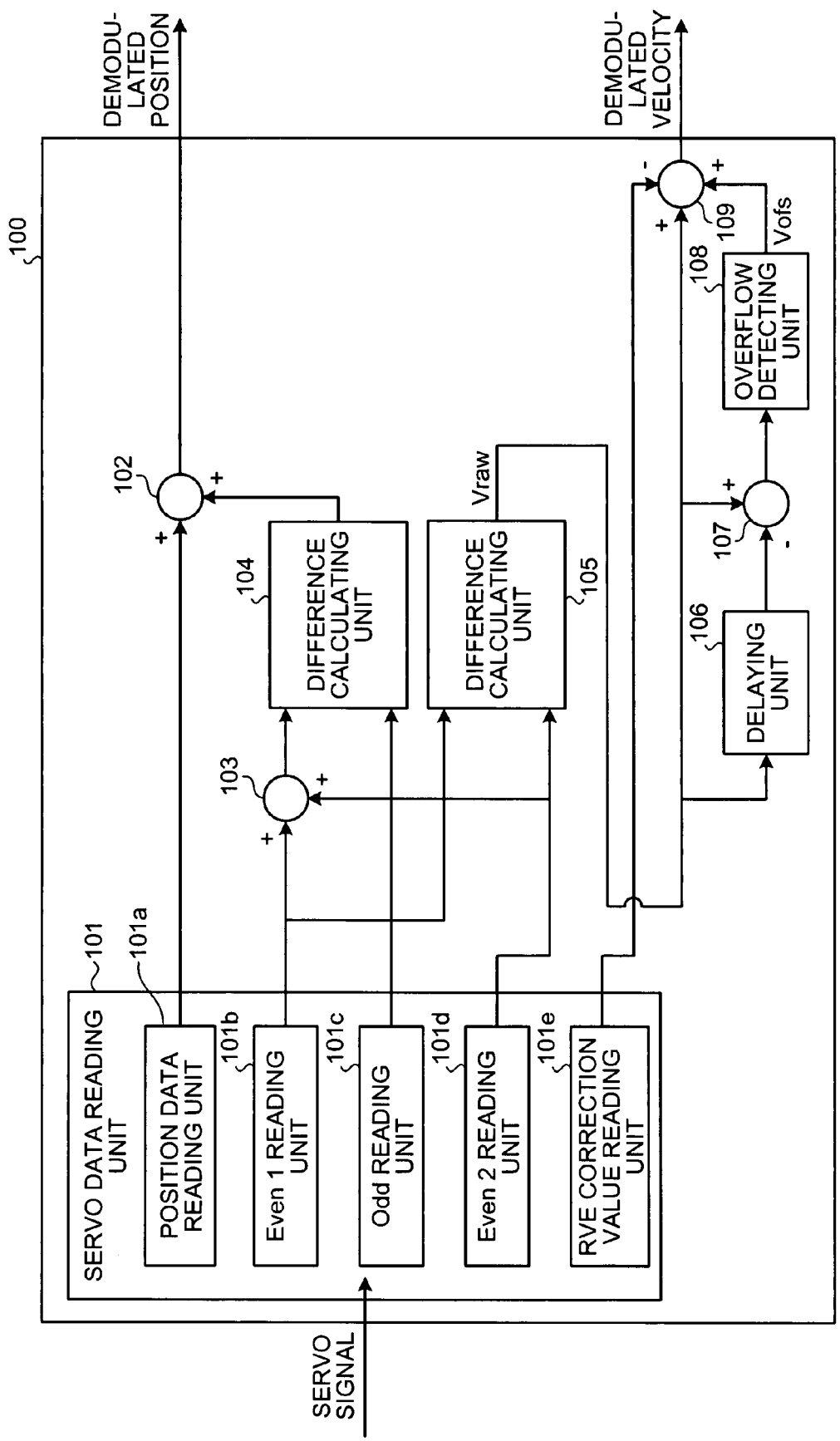
FIG. 6 is a functional block diagram of a position and velocity demodulating circuit shown in FIG. 5.

A configuration of the position and velocity demodulating circuit is described below. FIG. 6 is a functional block diagram of the position and velocity demodulating circuit 100. The position and velocity demodulating circuit 100 includes a servo data reading unit 101, integrating units 102 and 103, difference calculating units 104 and 105, a delaying unit 106, a differentiating unit 107, an overflow detecting unit 108, and an integrating unit 109.

The servo data reading unit 101 reads the servo data and demodulates the position and the moving velocity of the magnetic head. The servo data reading unit 101 includes a position data reading unit 101a, an Even1 reading unit 101b, an Odd reading unit 101c, an Even2 reading unit 101d, and an RVE correction value reading unit 101e.

The position data reading unit 101a inputs into the integrating unit 102 the track number of the analog signal obtained by reading and demodulating the gray code and the sector. The Even1 reading unit 101b inputs into the integrating unit 103 and the difference calculating unit 105 the analog signal obtained by reading and demodulating the Even1. The Odd reading unit 101c inputs into the difference calculating unit 104 the analog signal obtained by reading and demodulating the Odd. The Even2 reading unit 101d inputs into the integrating unit 103 and the difference calculating unit 105 the analog signal obtained by reading and demodulating the Even2. The RVE correction value reading unit 101e reads the write RVE correction value or the read RVE correction value, reverses the code, and inputs the resulting write RVE correction value or the read RVE correction value into the integrating unit 109.

Upon receiving the analog signal obtained by demodulating the Even1 and the analog signal obtained by demodulating the Even2, the integrating unit 103 determines an average of the two analog signals by vector operation, and inputs the result into the difference calculating unit 104. The difference calculating unit 104 calculates the difference between the average of the analog signals and the analog signal received from the Odd reading unit 101c, and inputs the difference into the integrating unit 102.

Upon receiving the analog signal obtained by demodulating the Even1 and the analog signal obtained by demodulating the Even2, the difference calculating unit 105 calculates the phase difference between the two signals, and outputs a demodulated velocity Vraw of the magnetic head. Vraw is input into the delaying unit 106, the differentiating unit 107, and the integrating unit 109.

Upon receiving the analog signal from the position data reading unit and analog signal from the difference calculating unit 104, the integrating unit 102 demodulates the position of the magnetic head based on the two signals, converts the analog signals into digital signals and outputs the digital signals to the outside.

Upon receiving Vraw, the delaying unit 106 obtains, by delaying Vraw by one sampling, the moving velocity of the magnetic head sampled in the cycle prior to the cycle in which Vraw is received, and inputs into the differentiating unit 107 Vraw and the value one sampling prior to Vraw. The differentiating unit 107 integrates Vraw and a code-reversed value one sampling prior to Vraw and inputs the resulting value into the overflow detecting unit 108.

Upon receiving the input from the differentiating unit 107, the overflow detecting unit 108 determines whether an absolute value of the difference of the input signals exceeds a predetermined threshold value, and if the absolute value of the difference of the input signals exceeds the threshold value, calculates a correction value Vofs to be added to Vraw to correct it. The overflow detecting unit 108 inputs the calculated Vofs into the integrating unit 109.

Upon receiving Vraw, Vofs, and the read RVE correction value or the write RVE correction value, the integrating unit 109 corrects Vraw by Vofs and the read RVE correction value or the write RVE correction value, performs digital conversion of the resulting value to obtain the demodulated velocity of the magnetic head, and outputs the digitally-converted demodulated velocity to the outside.

Figure 7:
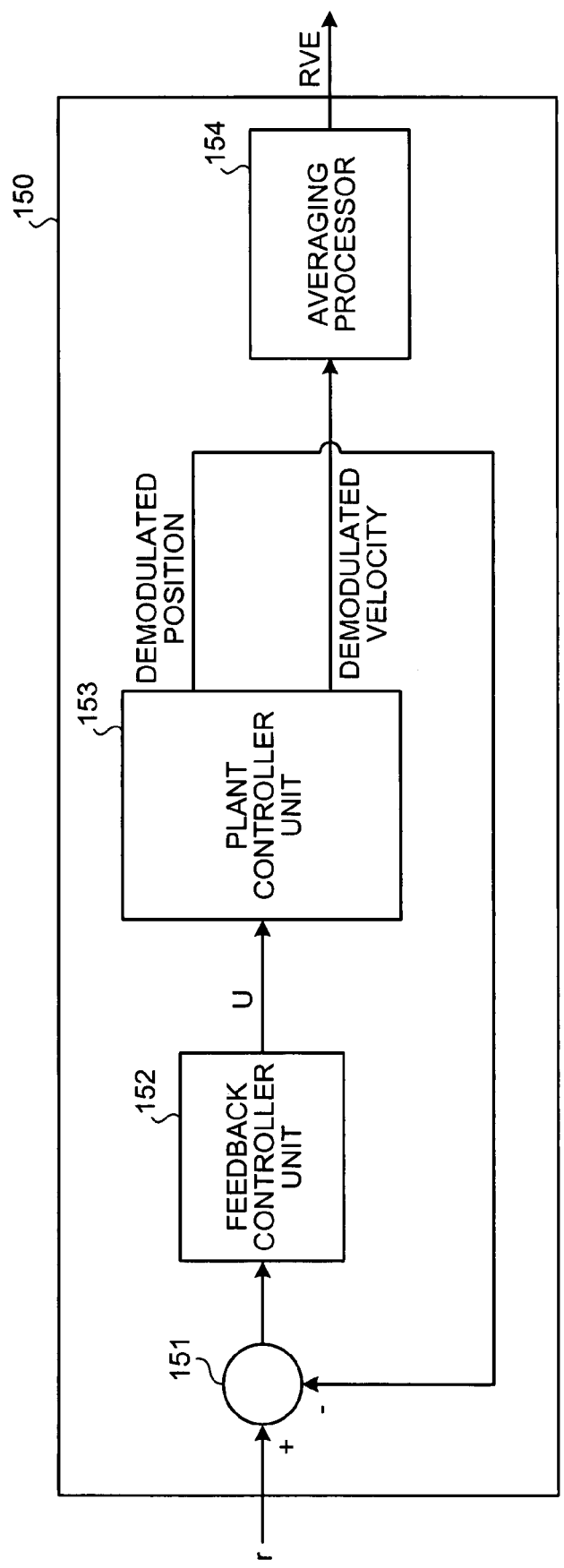
FIG. 7 is a functional block diagram of an RVE correction value calculating circuit shown in FIG. 5.

A configuration of the RVE correction value calculating circuit is described below. FIG. 7 is a functional block diagram of the RVE correction value calculating circuit 150. The RVE correction value calculating circuit 150 includes a differentiating unit 151, a feedback controller unit 152, a plant controller unit 153, and an averaging processor 154.

The differentiating unit 151 receives a target track and a current demodulated position y from the plant controller unit 153, adds a code-reversed value y of the demodulated position to the target track r, and passes on the sum to the feedback controller unit 152. In other words, the sum is a differential of the target track and the demodulated position y output by the plant controller unit 153.

Based on the sum received, the feedback controller unit 152 outputs to the plant controller unit 153 a feedback control signal U for correcting the differential of the target track r and the demodulated position y output by the plant controller unit 153.

The plant controller unit 153 receives the feedback control signal U, and based on the feedback control signal U, controls the movement of the actuator arm 217 and the magnetic head mounted on the free end of the actuator arm 217. The plant controller unit 153 outputs to the differentiating unit 151 the demodulated position y read and demodulated by the magnetic head during the feedback control, and outputs to the averaging processor 154 the demodulated velocity similarly read and demodulated by the magnetic head.

The averaging processor 154 outputs to the outside the RVE correction value obtained by averaging the variation of the demodulated velocity over time by a fixed time. If it is the write RVE correction value, it is recorded in the write RVE correction value recording area, and if it is the read RVE correction value, it is recorded in the read RVE correction value recording area.

Functional blocks of the RVE correction value calculating circuit 150 can perform an RVE correction value calculation process in the procedure described above.

Figure 8:
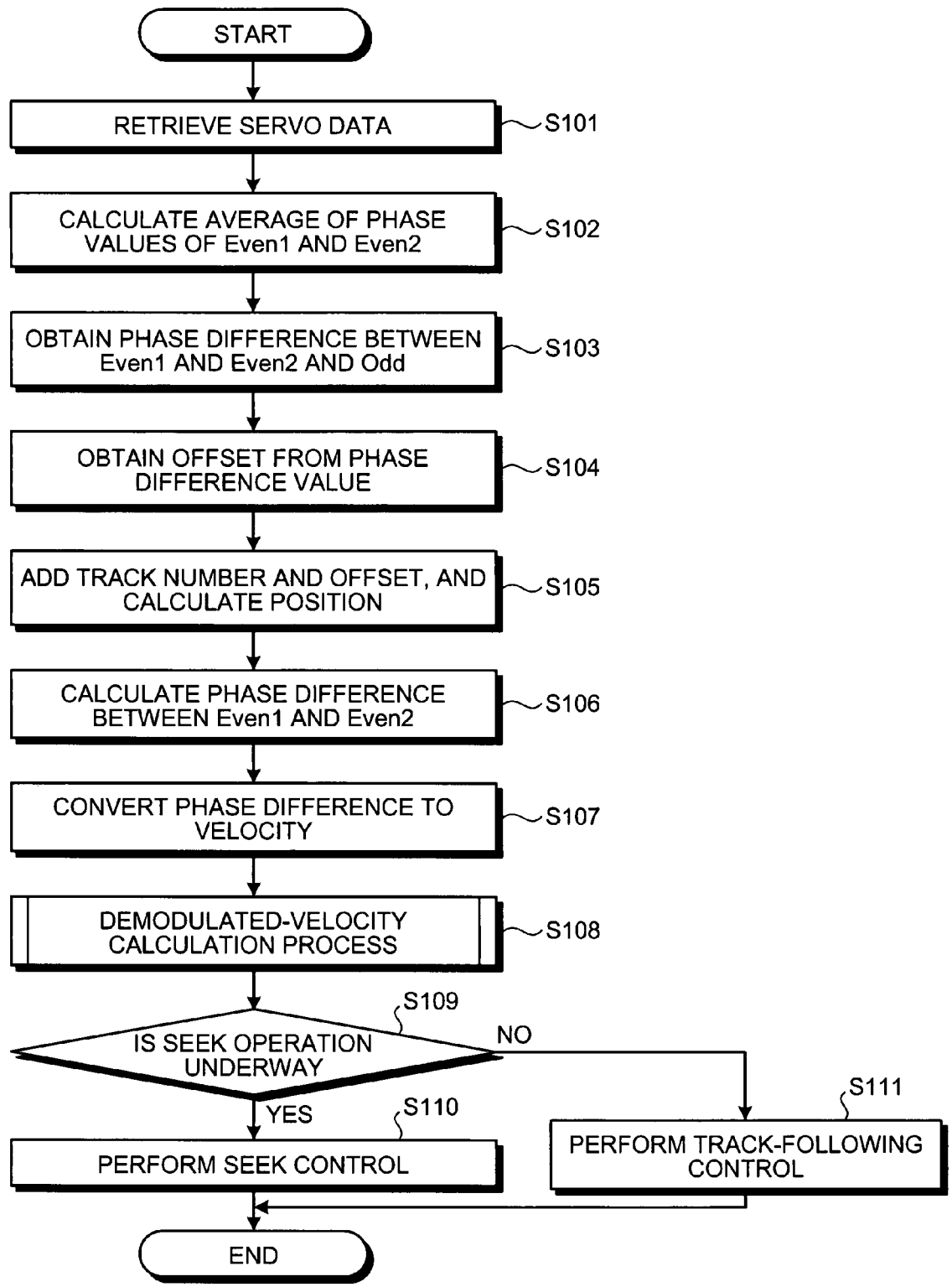
FIG. 8 is a flowchart of a position and velocity demodulation process performed by the position and velocity demodulating circuit.

A position and velocity demodulation process performed by the position and velocity demodulating circuit is described below. FIG. 8 is a flowchart of the position and velocity demodulation process performed by the position and velocity demodulating circuit 100. The servo data reading unit 101 obtains the servo data (step S101). Let us assume that the servo data obtained by the servo data reading unit 101 are a write RVE correction value RVE_WRITE and a read RVE correction value RVE_READ. The integrating unit 103 then calculates the average of the phase values of the Even1 and the Even2 of the servo data obtained by the servo data reading unit 101 (step S102). Next, the difference calculating unit 104 calculates the phase difference between the average of the Even1 and the Even2 and the Odd (step S103).

The difference calculating unit 104 then obtains an offset from the phase difference calculated at step S103 (step S104). Offset is data indicating the track displacement magnitude of the read track whose servo patterns are demodulated. The integrating unit 102 adds the track number and the offset, and calculates the correct position of the magnetic head (step S105).

The difference calculating unit 105 then calculates the phase difference between the Even1 and the Even2 (step S106) and determines the moving velocity of the magnetic head by dividing the track width equivalent to the phase difference calculated at step S106 by a time T in which the magnetic head traverses from the center of the Even1 to the center of the Even2 (step S107), performing a demodulated-velocity calculation process (step S108).

The MCU 205 of the magnetic disk device determines a seek operation is currently underway (that is, whether the magnetic head is moving in the radial direction of the magnetic disk 210) (step S109). If a seek operation is underway (Yes at step S109), the MCU 205 performs a seek control (step S110). If no seek operation is underway (No at step S109), the MCU 205 performs a track-following control (step S111).

Figure 9:
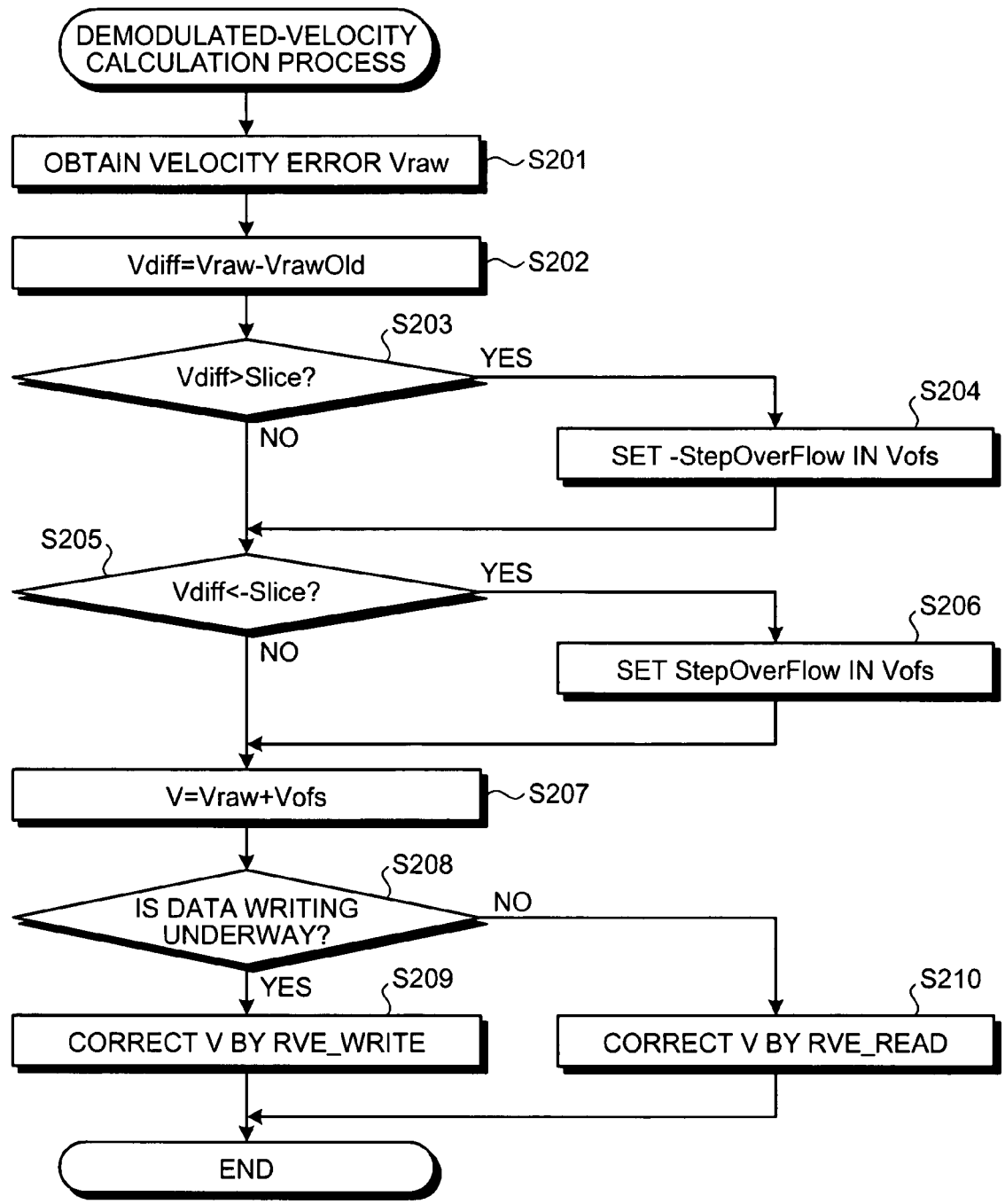
FIG. 9 is a detailed flowchart of a demodulated velocity calculation process shown in FIG. 8.

The demodulated-velocity calculation process is described below. FIG. 9 is a detailed flowchart of the demodulated-velocity calculation process shown in FIG. 8. The difference calculating unit 105 obtains the velocity error Vraw (step S201). The delaying unit 106 then delays the phase of the velocity error Vraw and calculates the velocity VrawOld sampled one cycle prior to Vraw. The differentiating unit 107 subtracts VrawOld from Vraw to obtain Vdiff (step S202).

The overflow detecting unit 108 determines whether Vdiff exceeds the slice (a predetermined threshold value (step S203), and if Vdiff exceeds the slice (Yes at step S203), sets −StepOverFlow in Vofs (step S204), and proceeds to step S205. If Vdiff does not exceed the slice (No at step S203), the process proceeds to step S205.

The overflow detecting unit 108 determines whether Vdiff is below the slice (step S205), and if Vdiff is below the slice (Yes at step S205), sets StepOverFlow in Vofs (step S206), and proceeds to step S207. If Vdiff is not below the slice (No at step S205), the process proceeds to step S207.

StepOverFlow is L/T, where L is the shortest distance between two tracks having servo data reproduction signals that are one cycle apart and T is the time required for the magnetic head to traverse between the center of the Even1 to the center of the Even2. In other words, when the magnetic head moves such that one cycle of the reproduction signal read from the servo pattern is exceeded in the time T, the magnetic head is regarded, according to the periodicity of the reproduction signal read from the servo pattern, as having moved equivalent to only the portion in excess of one cycle, the portion equivalent to one cycle not being recognized at all. Thus, by adding L/T to or subtracting L/T from the demodulated velocity, the heretofore disregarded movement of the magnetic head equivalent to one cycle is also reflected in the demodulated velocity.

At step S207; the integrating unit 109 the result obtained by adding Vofs to Vraw as a demodulated velocity V of the magnetic head. The MCU 205 of the magnetic disk device checks whether data writing is underway (step S208), if data writing is underway (Yes at step S208), the overflow detecting unit 108 corrects the demodulated velocity V by RVE_WRITE obtained at step S101 (step S209). If data writing is not underway (No at step S208), the overflow detecting unit 108 corrects the demodulated velocity V by RVE_READ obtained at step S101 (step S210).

Figure 10:
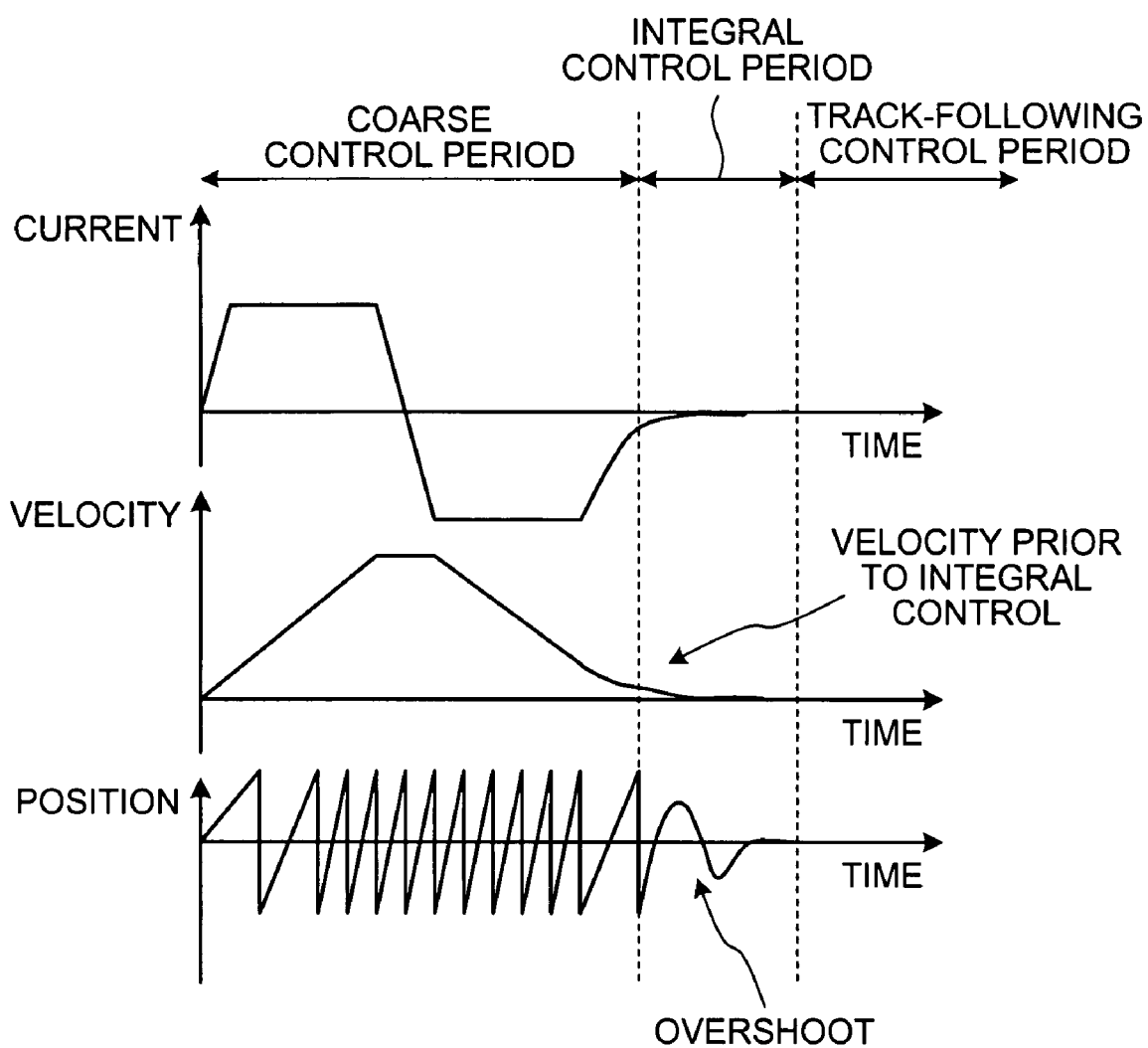
FIG. 10 is a schematic for explaining variations in seek waveform.

The variation in the seek waveform of the current supplied to the voice coil motor during a high-speed seek operation and the seek waveforms indicating the velocity and the position of the magnetic head over time are described below. FIG. 10 is a schematic for explaining variations in the seek waveform, and depicts changes in the current, the velocity, and the position of the head from a coarse control period to a track-following control period via an integral control period. Coarse control is velocity control while integral control and track-following control are position control.

A predetermined amount of current is supplied to the voice coil motor in the coarse control period of a high-speed seek operation. The acceleration of the magnetic head can be increased or decreased by increasing or decreasing the supply of the current. During the coarse control period, the target track, or the track over which the magnetic head positions itself, varies according to seek control.

In coarse control, the control mode is switched between acceleration, steady, and deceleration. In the acceleration mode, the velocity is increased by passing the current. In the steady mode, the current flow is cut down to zero to maintain a constant speed. In the deceleration mode, the current is passed in the opposite direction to the acceleration mode, to bring down the velocity at the target position or its vicinity to zero.

In the period spanning the coarse control, the integral control, and the track-following control, the current supplied to the voice coil motor is appropriately controlled so that the position error detected by demodulating the servo data sector-wise is corrected. After the coarse control period and the integral control period, when the track-following control period arrives, appropriate current is supplied to the voice control motor so that position error detected by demodulating the servo data sector-wise is corrected to make the magnetic head follow the track center of the target track.

When a large amount of current is supplied to the voice coil motor during a high-speed seek operation, the magnetic head tends to continue to vibrate during the integral control period due to the resonance in the head actuator 214 and the head mechanism. The vibration of the magnetic head during the integral control period is called an overshoot. When the overshoot is large, it becomes necessary to prolong the integral control period to curb the overshoot and guide the magnetic head to follow the track center.

Therefore, it has been made possible in the first embodiment to correct the demodulated velocity overflow that occurs during a high-speed seek operation, and to precisely control the velocity of the magnetic head based on the correct demodulated velocity. Particularly, velocity control by controlling the overshoot of the magnetic head in the integral control period has been made possible. Consequently, by preventing large overshoots from occurring, unnecessary vibration of the magnetic head can be prevented and the integral control period can be shortened.

Further, it has been made possible to correct repeatable velocity error alongside overflow correction. Consequently, a more precise feedback control can be performed to position the magnetic head over the target track and the integral control period can be shortened.

Figure 11:
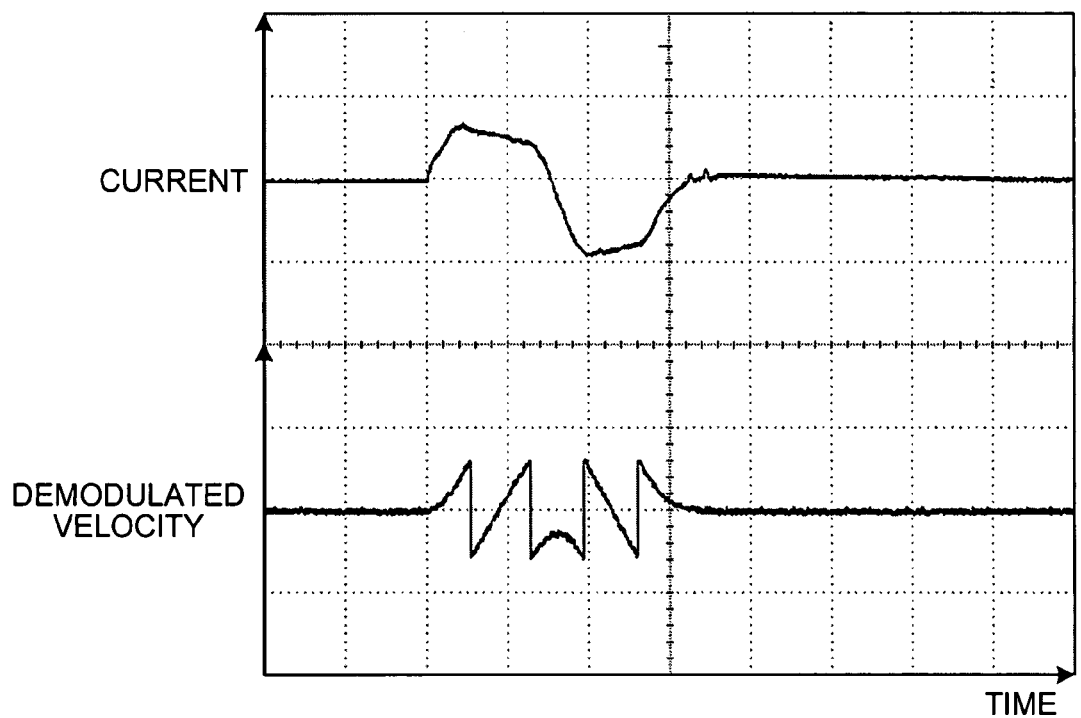
FIG. 11 is a schematic for explaining demodulated velocity prior to overflow correction.
Figure 12:
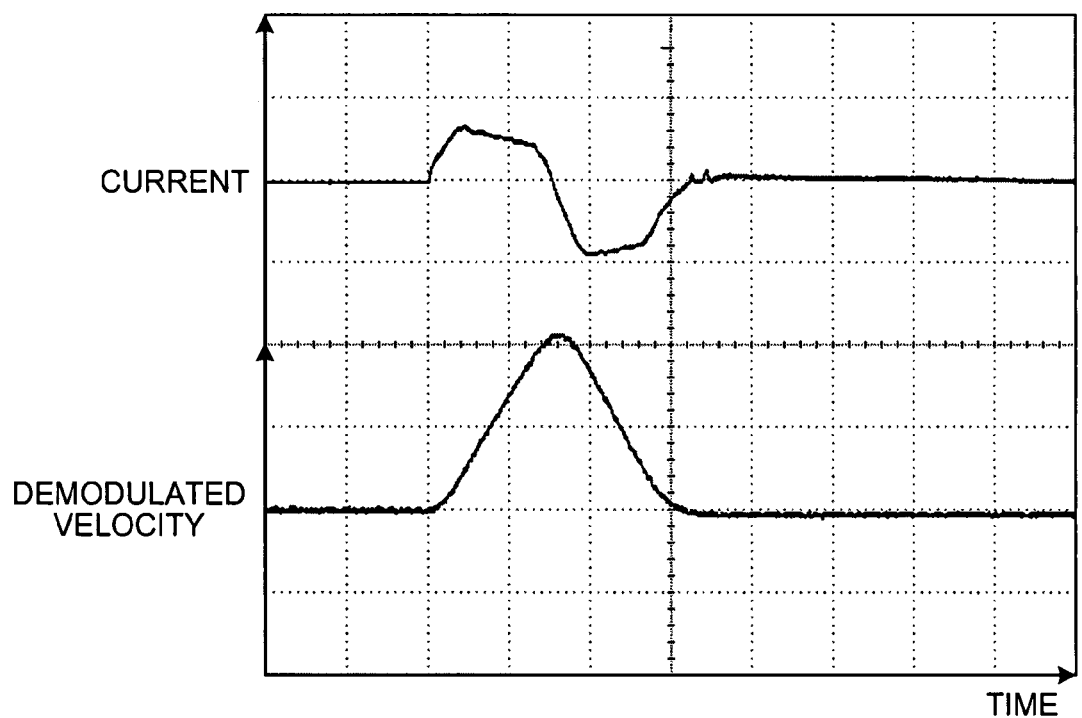
FIG. 12 is a schematic for explaining demodulated velocity after overflow correction.

FIG. 11 is a schematic for explaining demodulated velocity prior to overflow correction. FIG. 12 is a schematic for explaining demodulated velocity after overflow correction. In both FIGS. 11 and 12, a relation between the current supplied to the voice coil motor and demodulated velocity is shown.

As shown in FIG. 11, prior to overflow correction, demodulated velocity is obtained according to the variation in the current. However, overflow occurs in demodulated velocity due to high-speed seek operation leading to staggering in the demodulated velocity and giving rise to an uneven waveform.

Therefore, as shown in FIG. 12, in the first embodiment, the unevenness due to staggering in the demodulated velocity can be corrected by correcting the demodulated velocity overflow. A more precise feedback control of the magnetic head can be performed based on the accurate demodulated velocity obtained by correcting the demodulated velocity overflow.

Figure 13:
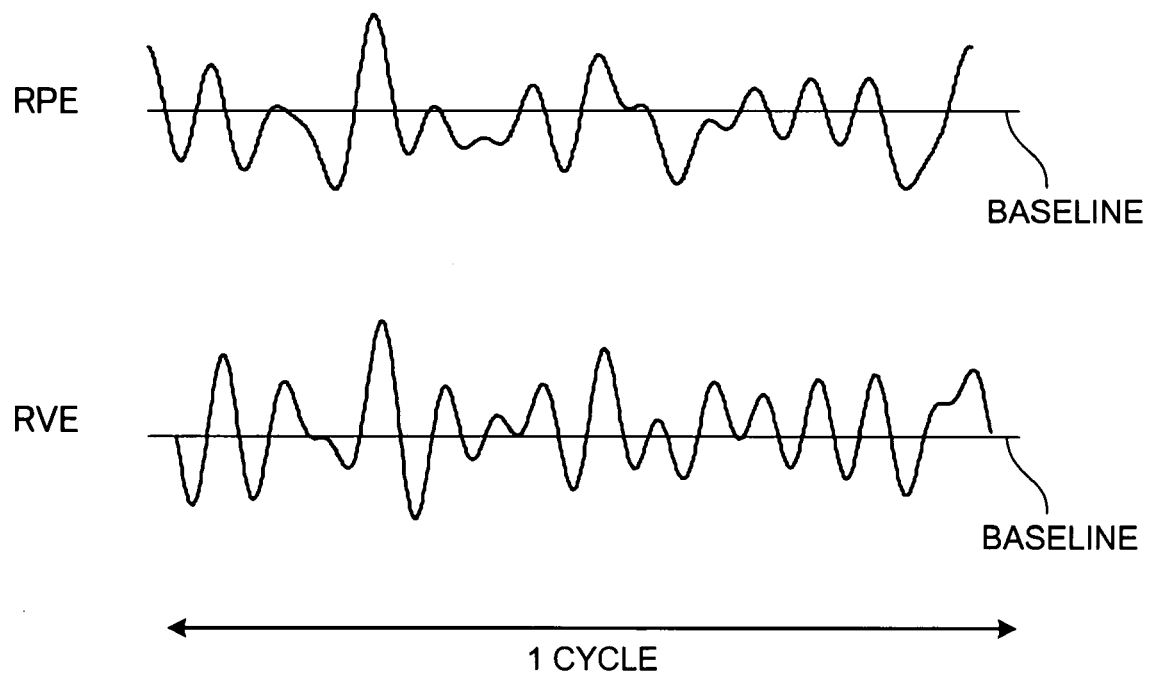
FIG. 13 is a schematic for explaining variation of RPE and RVE in one cycle.

However, even if the demodulated velocity overflow is corrected as shown in FIG. 12, RPE and RVE still occur synchronous with the rotation of the magnetic disk. In FIG. 13, RPE and RVE are represented by waveforms waves that deviate above and below the baseline. RPE and RVE in FIG. 13 indicate cyclic waveforms, and the baseline represents the trajectory of the magnetic head when there is no error synchronous with the rotation of the magnetic disk. RPE and RVE are trajectories of the magnetic head when there is error synchronous with the rotation of the magnetic disk. RPE and RVE occurring during one cycle is shown in FIG. 13, and the same pattern is repeated during every cycle.

More accurate demodulated signals can be obtained by correcting the RPE and RVE. Particularly, by storing the RVE correction value in a predetermined storage area of the magnetic disk 210 and correcting the demodulated velocity of the magnetic head based on the RVE correction value when writing data to or reading data from the magnetic disk, it has been made possible to improve the precision of the feedback control of the magnetic head and control the movement of the magnetic head more accurately.

Figure 14:
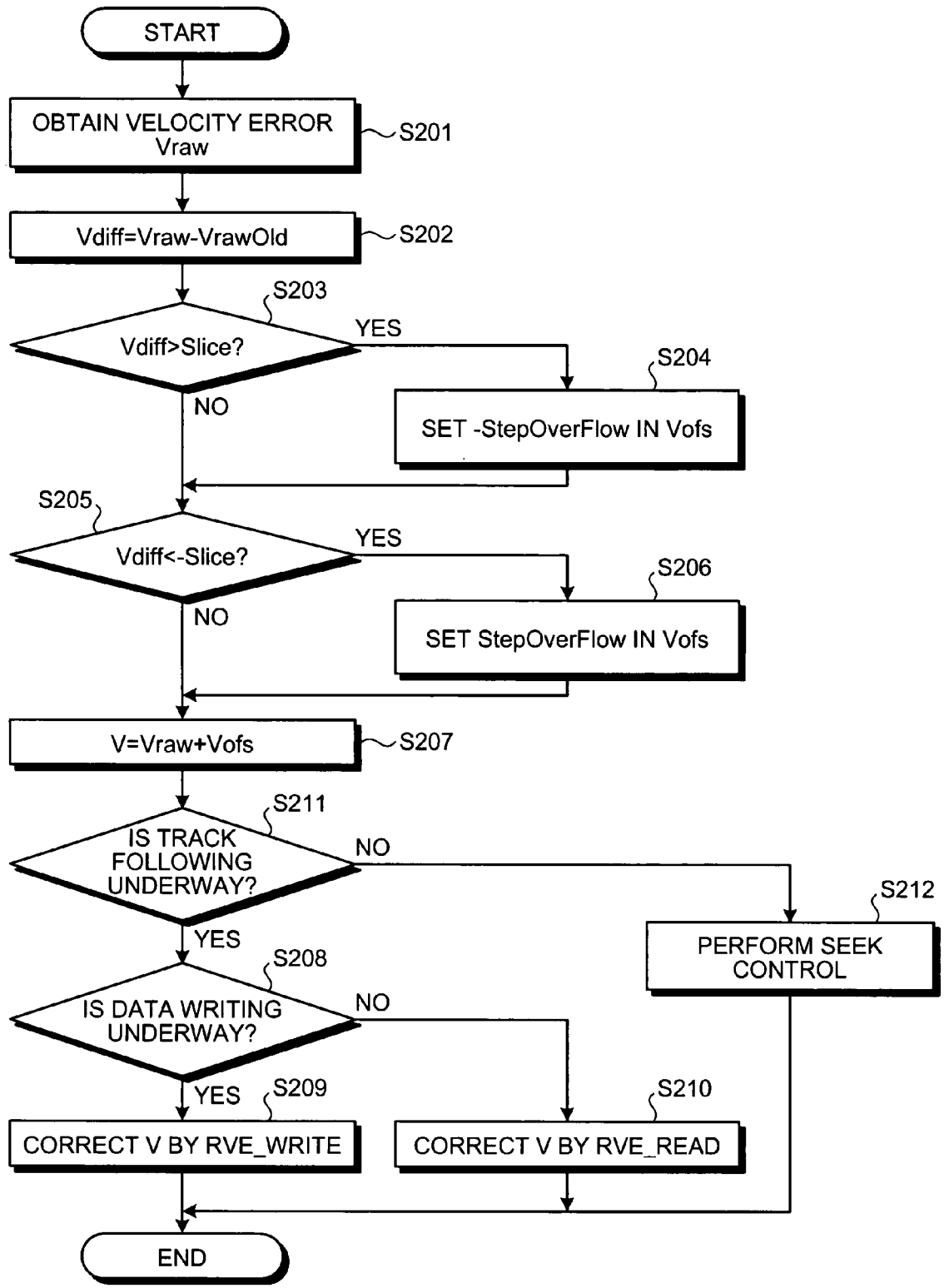
FIG. 14 is a flowchart of a demodulated-velocity calculation process according to another embodiment of the present invention.

Another embodiment of the demodulated-velocity calculation process shown in FIG. 9 is described below. FIG. 14 is a flowchart of a demodulated-velocity calculation process according to another embodiment of the present invention. Only the steps in FIG. 14 that are different from those in FIG. 9 are explained. The demodulated-velocity calculation process shown in FIG. 14 differs from that of the first embodiment shown in FIG. 9 in that it is performed for correcting RVE only during track following.

In the demodulated-velocity calculation process shown in FIG. 14, there is an additional step between step S207 and step S208. After step S207, the MCU 205 of the magnetic disk device determines whether track following is underway (step S211). If track following is underway (Yes at step S211), the process proceeds to step S208, and if track following is not underway (No at step S211), seek control is performed (step S212). The demodulated-velocity calculation process is ended upon completion of step S212.

The respective processes described in the embodiments can be entirely or partially realized by a computer program executed by a processing unit such as CPU (or MCU, MPU, etc.) in the magnetic disk device 300. In the example of FIG. 5, programs for executing the various processes are stored in the ROM 204, and the MCU 205 reads the programs from the ROM 204 to execute them, thereby realizing the same function as the position and velocity demodulating circuit 100.

The programs need not necessarily be stored in the ROM 204 but can be read by the MCU 205 from a portable physical medium or from an external computer system connected via a network to be executed. In addition, the processes need not necessarily be performed by the MCU 205 that reads and executes codes previously stored in the ROM 204. The processes can also be implemented by wired logic.

As set forth hereinabove, according to the embodiments of the present invention, a repeatable velocity error is corrected based on servo data read by the magnetic head. In the case where a repeatable velocity error occurs while data is being written to or read from a storage medium, the repeatable velocity error is corrected, and demodulated velocity of head movement is corrected by the correction value of the repeatable velocity error. Thus, the velocity of head movement can be accurately demodulated.

Moreover, in the storage device, the head movement can be accurately controlled by using the velocity of head movement demodulated directly from the servo data. Consequently, data can be written to or read from the storage medium efficiently and swiftly. Besides, feedback control of the velocity of head movement can be accurately performed based on the corrected repeatable velocity error.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device that demodulates servo data read by a head from a storage medium of a storage device, the control device comprising:
    a demodulating unit that demodulates a moving velocity of the head based on the servo data; and
    a correcting unit that corrects demodulated moving velocity by a correction value for a repeatable velocity error in the storage medium,
    wherein the correction value is obtained by demodulating servo signals generated from correction value data for the repeatable velocity error included in the servo data.

2. The control device according to claim 1, wherein
    the demodulating unit demodulates the moving velocity of the head when data is written to the storage medium; and
    the correcting unit corrects the demodulated moving velocity by a correction value for a repeatable velocity error that occurs when the data is written to the storage medium.

3. The control device according to claim 1, wherein
    the demodulating unit demodulates the moving velocity of the head when data is read from the storage medium; and
    the correcting unit corrects the demodulated moving velocity by a correction value for a repeatable velocity error that occurs when the data is read from the storage medium.

4. The control device according to claim 1, wherein the correcting unit corrects the demodulated moving velocity only when the head is in track-following control.

5. A storage device comprising:
    a control device that demodulates servo data read by a head from a storage medium;
    a demodulating unit that demodulates a moving velocity of the head based on the servo data; and
    a correcting unit that corrects demodulated moving velocity by a correction value for a repeatable velocity error in the storage medium,
    wherein the correction value is obtained by demodulating servo signals generated from correction value data for the repeatable velocity error included in the servo data.

6. The storage device according to claim 5, wherein
    the demodulating unit demodulates the moving velocity of the head when data is written to the storage medium; and
    the correcting unit corrects the demodulated moving velocity by a correction value for a repeatable velocity error that occurs when the data is written to the storage medium.

7. The storage device according to claim 5, wherein
    the demodulating unit demodulates the moving velocity of the head when data is read from the storage medium; and
    the correcting unit corrects the demodulated moving velocity by a correction value for a repeatable velocity error that occurs when the data is read from the storage medium.

8. The storage device according to claim 5, wherein the correcting unit corrects the demodulated moving velocity only when the head is in track-following control.

9. A storage medium that stores therein servo data based on which a control device of a storage device demodulates a moving velocity of a head, wherein
    the servo data includes a correction value of a repeatable velocity error for the moving velocity of the head that is demodulated when data is written to the storage medium.

10. The storage medium according to claim 9, wherein the servo data includes a correction value of a repeatable velocity error for the moving velocity of the head that is demodulated when data is read from the storage medium.

11. The storage medium according to claim 9, wherein the servo data includes a correction value of a repeatable position error for a position of the head that is demodulated at any one of data writing to and data reading from the storage medium.

12. A computer-readable recording medium that stores therein a computer program for demodulating servo data read by a head from a storage medium of a storage device on a control device of the storage device, the computer program causing a computer to execute:

demodulating a moving velocity of the head based on the servo data; and correcting demodulated moving velocity by a correction value for a repeatable velocity error in the storage medium, wherein the correction value is obtained by demodulating servo signals generated from correction value data for the repeatable velocity error included in the servo data.

13. The computer-readable recording medium according to claim 12, wherein the demodulating includes demodulating the moving velocity of the head when data is written to the storage medium; and the correcting includes correcting the demodulated moving velocity by a correction value for a repeatable velocity error that occurs when the data is written to the storage medium.

14. The computer-readable recording medium according to claim 12, wherein the demodulating includes demodulating the moving velocity of the head when data is read from the storage medium; and the correcting includes correcting the demodulated moving velocity by a correction value for a repeatable velocity error that occurs when the data is read from the storage medium.

15. The computer-readable recording medium according to claim 12, wherein the correcting includes correcting the demodulated moving velocity only when the head is in track-following control.

16. A servo data demodulation method for demodulating servo data read by a head from a storage medium of a storage device, the servo data demodulation method comprising:

demodulating a moving velocity of the head based on the servo data; and correcting demodulated moving velocity by a correction value for a repeatable velocity error in the storage medium, wherein the correction value is obtained by demodulating servo signals generated from correction value data for the repeatable velocity error included in the servo data.

17. A repeatable velocity error measuring device that measures repeatable velocity error that occurs when servo data is read from a storage medium, servo data being used for positioning of a head over a target position on the storage medium in a storage device, the repeatable velocity error measuring device comprising:

an error measuring unit that measures the repeatable velocity error related to a moving velocity of the head based on information on the target position, wherein the error measuring unit measures a write repeatable velocity error corresponding to the positioning of the head when data is written to the storage medium, and a read repeatable velocity error corresponding to the positioning of the head when data is read from the storage medium.

18. The repeatable velocity error measuring device according to claim 17, further comprising a recording unit that writes the repeatable velocity error to a predetermined area of the servo data.

* * * * *